United States Patent [19]

Dubois

[11] Patent Number: 5,055,536

[45] Date of Patent: Oct. 8, 1991

[54] PROCESS TO PREPARE VINYL ETHER POLYMERS

[75] Inventor: Donn A. Dubois, Houston, Tex.

[73] Assignee: Shell Oil Company, Houston, Tex.

[21] Appl. No.: 564,523

[22] Filed: Aug. 9, 1990

[51] Int. Cl.$^5$ .................. C08F 4/16; C08F 12/24; C08F 16/16

[52] U.S. Cl. .................. 526/194; 526/313; 526/332; 526/292.9; 526/273; 526/312; 526/279

[58] Field of Search ........................ 526/194

[56] References Cited

U.S. PATENT DOCUMENTS

| | | | |
|---|---|---|---|
| 2,104,000 | 12/1937 | Reppe | 526/90 |
| 2,882,244 | 4/1959 | Milton | 252/455 |
| 3,228,923 | 1/1966 | Scott et al. | 260/91.1 |
| 3,365,433 | 1/1968 | Manson et al. | 260/91.1 |
| 3,394,116 | 7/1968 | Sorkin | 260/91.1 |
| 3,461,075 | 8/1969 | Manson et al. | 252/301.3 |
| 3,819,596 | 6/1974 | Gross | 260/91.1 M |
| 4,866,145 | 9/1989 | Dicker | 526/190 |

FOREIGN PATENT DOCUMENTS

| | | |
|---|---|---|
| 74004055 | 1/1974 | Japan . |
| 096195/13 | 2/1989 | Japan . |
| 1561968 | 3/1980 | United Kingdom . |

OTHER PUBLICATIONS

"Living Cationic Polymerization of P-Methoxystyrene by Hydrogen . . . ", Higashimura et al., Polymer Bulletin, 19, 7-11, 1988.
"Hydrogen Iodide/Zinc Iodide: A New Initiating System for Living Cationic . . . ", Sawamoto et al., Macromolecules, 1987, 20, 2693-2697.
"Mechanism of Living Polymerization of Vinyl Ethers by the Hydrogen Iodide . . . ", Higashimura et al., Macromolecules, 1985, 18, 611-616.
"Synthesis of Monodisperse Living Poly(vinyl ethers) and Block Copolymers . . . ", Miyamoto et al., Macromolecules, 1984, 17, 2228-2230.
"Synthesis of P-Methoxystyrene-Isobutyl Vinyl Ether Block Copolymers by Living Cationic . . . ", Higashimura et al., Macromolecules, 1979.
Hawley's Condensed Chemical Dictionary, 11th Ed., VanNostrand, New York, 1987, pp. 697-698, 792-793, 1248-1249.
R. Szostak, "Molecular Sieves", Van Nostrand, New York, 1989, pp. 2-3, 26-27.
Kirk Othmer Encyclopedia of Chemical Technology, 3rd Ed. (1981), pp. 638-669, "Molecular Sieves".
O. W. Webster et al., (1983) J. Am. Chem. Soc. 105, 5706-5708.

*Primary Examiner*—Joseph L. Schofer
*Assistant Examiner*—M. Nagumo
*Attorney, Agent, or Firm*—James O. Okorafor

[57] ABSTRACT

A method of preparing vinyl ether polymers is provided. The process utilizes as a catalyst an iodine containing electrophile and a zeolite. The vinyl ethers cationically polymerize to polymers having narrow molecular weight distributions. The vinyl ether may be copolymerized with styrene, alkyl-substituted styrenes, alkoxy-substituted styrenes and mixtures thereof.

15 Claims, No Drawings

PROCESS TO PREPARE VINYL ETHER POLYMERS

FIELD OF THE INVENTION

This invention relates to a process to polymerize vinyl ethers.

BACKGROUND OF THE INVENTION

Polymers of vinyl ether and processes to prepare these polymers by cationic polymerization are known. For example, Higashimura describes a process for polymerizing vinyl ether and para-methoxy styrenes wherein a catalyst obtained by combining HI and $I_2$ or $ZnX_2$ wherein X is a halogen such as iodine, chlorine or bromine is used, Higashimura et al., Macromolecules, Vol. 12, p. 178 (1979). This system is effective in the preparation of these polymers, but the zinc halides are toxic and a process which utilizes a non-toxic catalyst is desirable. The zinc catalysts are also soluble in the polymer solutions and will contaminate the polymer requiring a costly catalyst extraction procedure. Without removing the catalyst the polymer will be highly disclored and the polymer generally has an undesirable color even after catalyst extraction.

Alternative processes to prepare vinyl ether polymers include utilization of zeolites as catalysts. Exemplary processes are described in, for example, U.S. Pat. Nos. 3,228,923; 3,365,433; 3,394,116; 3,461,075; and 3,819,596. Although the mechanism for this polymerization is not clear, it does not appear to be a cationic polymerization. The resultant polymers may have high molecular weights, but have an extremely wide molecular weight distribution. The polymer made by the process of U.S. Pat. No. 3,819,596 is touted as an excellent plasticizer due to the broad molecular weight distribution. The index of dispersity (ratio of highest molecular weight to peak molecular weight) for these polymers exceeds 20. The polymer produced by this method is said to have a molecular weight distribution which extends from 180 to 800,000. This wide molecular weight distribution is beneficial for some properties and end uses, such as tackifiers and plasticizers. For other end uses, a narrow molecular weight distribution is preferred. For molding compositions, films and extruded products, having a high tensile strength with a low melt viscosity is desirable. Compositions which have a wide variety molecular weights generally have a of high melt viscosity due to the high molecular weight constituents, and a relatively low tensile strength due to the low molecular weight constituents. A polymer with a narrow molecular weight distribution is therefore preferred for many applications.

Polymers which have narrow molecular weight distributions are also preferred as lubricating oil additives viscosity index improvers. Polymers that are high in molecular weight are degraded by mechanical shear while in lubricating oil service. High molecular weight polymers also contribute disproportionately to the thickening effect, or change in viscosity for a constant amount of polymer added. The shearing of these high molecular weight polymers therefore drastically affects the viscosity of the lubricating oil composition. Having a narrow molecular weight distribution therefore results in a viscosity index improver with a minimal change in viscosity over time for a similar initial thickening effect.

It is therefore an object of this invention to provide a process to polymerize vinyl ethers which results in polymer compositions having narrow molecular weight distributions and wherein soluble cocatalyst is not required.

SUMMARY OF THE INVENTION

The objects of the present invention are achieved by providing a process to polymerize vinyl ether utilizing an iodine containing electrophile as an initiator and a zeolite as a coinitiator. This initiator system, when utilized under favorable solvent and temperature conditions, can result in high molecular weight polymers with narrow molecular weight distributions, and can be utilized to produce block copolymers by sequential monomer addition. A preferred iodine containing electrophile is trimethylsilyliodide. Other iodine containing electrophiles which may be utilized include HI.

DETAILED DESCRIPTION OF THE INVENTION

The vinyl ether useful in the present invention may be of the general formula:

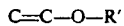

wherein R' is an alkyl, cycloalkyl or alkyl substituted cycloalkyl, aromatic or alkyl substituted aromatic having from about 1 to about 20 carbon atoms R' may optionally be substituted with such groups as halogen, epoxy, tertiary amine, vinyl, siloxy and the like.

The catalyst useful in the process of the present invention is prepared by combining trimethylsilyliodide, hydrogen iodide or another iodine-containing electrophile with a zeolite to produce an initiator system.

The amount of iodine utilized is determined by the desired polymer molecular weight. In general, the moles of iodine provided will be equal to the grams of monomer divided by the desired weight average polymer molecular weight.

Zeolites which have acid sites are effective as the cocatalysts of this invention. Acidity can be introduced by the decomposition of the $NH_4+$ ion-exchanged form, by hydrogen-ion exchange, and by hydrolysis of zeolite containing multivalent cations during hydrogenation.

A wide variety of acid site containing zeolites may be utilized as the cocatalysts of this invention. The zeolites can include both synthetic and naturally occurring zeolites. Illustrative of the synthetic zeolites are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta, 3,308,069; Zeolite EU-1, 4,537,754; Zeolite ZK-4, 3,314,752; Zeolite ZSM-5, 3,702,886; Zeolite ZSM-11, 3,709,979; Zeolite ZSM-12, 3,832,449; Zeolite ZSM-20, 3,972,983; Zeolite ZSM-35, 4,016,245; Zeolite ZSM-50, 4,640,829; synthetic mordenite; the so-called ultrastable zeolites of U.S. Pat. Nos. 3,293,192 and 3,449,070; and the references cited therein, incorporated herein by reference. Other acceptable synthetic zeolites are described in the book "Zeolite Molecular Sieves-Structure, Chemistry and Use," by Donald W. Breck, 1974, John Wiley & Sons, incorporated by reference herein. Illustrative of the acceptable naturally occurring zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, and yugawaralite. Descriptions of certain acceptable naturally occurring zeolites are found in the aforementioned book by Breck, and in the book "Molecular Sieves-Principles of Synthesis and Identification", by R. Szostak, Van Nostrand Reinhold, New York, 1989, incorporated by reference herein. These zeolites may be in the hydrogen form or may be partially or fully exchanged with ammonium or metal ions.

The zeolites which are preferred are faujasites, which include synthetic zeolites such as zeolite X and zeolite Y. A zeolite X, which is a crystalline sodium aluminosilicate with pores or channels of approximately 13 Angstrom units in diameter is available commercially as Molecular Sieve 13X. As prepared, the 13X material contains water and has the unit cell formula $$Na_{86}(AlO_2)_{86}(SiO_2)_{106} \cdot 267 H_2O$$

The parent zeolite should be dehydrated to make the active catalyst. A synthetic zeolite known as Molecular Sieve 10X is a crystalline aluminosilicate salt having channels above 10 Angstrom units in diameter and in which a substantial proportion of the sodium ions of the 13X material have been replaced by calcium.

The amount of zeolite which is present for the polymerization of this invention is preferably between about 5 and about 500 grams per gram mole of iodide. This corresponds to about 2 to about 500 parts by weight of vinyl ether to zeolite, and more preferably, about 2 to about 50.

In general, the polymerization of this invention may be carried out in batch, continuous or semi-continuous operations. The nominal residence time under polymerization conditions will preferably range from about 1 to about 3 hours. The reaction is complete after essentially all monomer is converted to polymer.

The polymerization reaction of this invention can be accomplished at a temperature within the range from about $-80°$ to about 200° C. in hydrocarbon, ethereal or halogenated hydrocarbon solvents that do not contain acidic hydrogens and which are inert to the reagents used. The pressure employed is not critical and essentially any pressure may be employed while atmospheric pressure is particularly effective.

The catalyst system of this invention may also be utilized to prepare copolymers of different vinyl ethers, or copolymers of one or more vinyl ether and one or more other comonomer. A preferred comonomer is an alkyl or alkoxy substituted styrene. The aromatic ring of these substituted benzenes enable a sufficiently stable cation to permit cationic polymerization. These preferred comonomers are of the general formula:

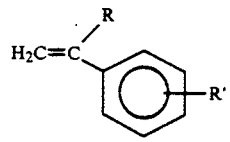

wherein:
R is a hydrogen or an alkyl group, and
R' is a hydrogen, alkyl, or alkyloxy.

A particularly preferred alkoxy substituted styrene is methyloxystyrene. Styrene is also a preferred comonomer.

Copolymers of different vinyl ethers and of vinyl ethers and other comonomers may be of block, random, or tapered sequences and may be of radial, linear or branched structures.

The polymers of this invention are useful as interfacial agents, adhesives or in adhesive formulations lubricating oil viscosity index improvers, and as rheological modifiers. Block copolymers of vinyl ethers and styrenes are useful as interfacial agents, compatiblizers for polymer blends, adhesives and coatings.

PREFERRED EMBODIMENT OF THE INVENTION

In a preferred embodiment of the present invention, vinyl ether polymer will be prepared using a catalyst obtained by combining hydrogen iodide or trimethylsilyliodide with an X series zeolite. The vinyl ether will have the general formula:

C=C—O—R' wherein R' in the preferred embodiment is an alkyl group having from about 1 to about 20 carbon atoms.

The preferred catalyst will be prepared by combining from about 10 to about 200 grams of zeolite per mole of iodine. The preferred polymer will be prepared at atmospheric pressure, at a temperature within the range from about $-20°$ to about 50° C. in an alkane hydrocarbon, halogenated hydrocarbon, aromatic hydrocarbon, or a mixture thereof. The resulting polymer will have a number average molecular weight between about 1,000 and about 1,000,000 and will have a molecular weight distribution (Mw/Mn) of less than about 2.5.

EXAMPLE 1

A polymer of isobutylvinyl ether (IBVE) was prepared at atmospheric pressure by first charging 3.7 grams of IBVE into a bottle containing 60 ml of toluene. Trimethylsilyliodide (TMSI) was then injected into the bottle in an amount of 0.2 ml (0.001 moles) followed by the addition of 0.25 grams of a 13X zeolite. The solution changed from clear to yellow with a slight increase in solution viscosity as the polymerization proceeded. The IBVE remaining in the solution was determined at time intervals by gas chromatography. Throughout the polymerization, the reaction temperature remained at about 25° C. After 40 minutes, about 70 percent of the initial IBVE remained and after 16 hours, the IBVE was essentially completely converted (99.8 percent) to polymer. The polymer was isolated by removing the solvent in a rotary evaporator. The resulting polymer had a number average molecular weight of about 10,000 as determined by gel permeation chromatography (GPC)

and a molecular weight distribution (Mw/Mn) of about 1.80.

This example demonstrates that solid zeolites may be substituted for the toxic and difficult to separate zinc halides $ZnX_2$ catalysts in the preparation of narrow molecular weight vinyl ether polymers.

EXAMPLE 2

A polymer of IBVE was prepared utilizing the same catalyst, conditions, and amount of monomer as those utilized in Example I, except that the temperature of the reaction was held at 50° C. The polymer produced had a Mw/Mn of 2.34 and the number average molecular weight was determined by GPC to be 2,000. This example demonstrates that reaction temperatures of 50° C. may be utilized but are not preferred due to the detrimental effect on polymer molecular weight distribution.

EXAMPLE 3

The polymerization procedure of Example 1 was repeated with the exception that 0.001 moles of HI was substituted for the TMSI. The polymer produced had a Mw/Mn of 1.51 and a number average molecular weight of 11,000. This example demonstrates that HI can be utilized as the initiator in the practice of the present invention.

EXAMPLE 4

The polymerization procedure of Example 1 was again repeated, but the amount of zeolite was increased to 1.5 grams, and the amount of monomer was 3.8 grams. Polymerization was essentially complete (99.5 percent of monomer polymerized) after 2.5 hours. The polymer had a Mw/Mn of 2.2 and a number average molecular weight of 3,000. This example demonstrates that a higher ratio of zeolite to monomer will result in more rapid polymerization, but at the expense of a slight increase in the polymer molecular weight distribution.

COMPARATIVE EXAMPLE

About 4 grams of IBVE was placed in a bottle with 60 ml of toluene and 2.0 grams of the 13X zeolite. The IBVE was allowed to polymerize for 22 hours, at which time the amount of unreacted monomer remaining in the solution was determined to be 7.5 percent. The polymer produced had a Mw/Mn of 15.2 and a number average molecular weight of about 1700. This comparative example demonstrates the need for the iodine ion in order to accomplish complete polymerization of a vinyl ether to a polymer having a narrow molecular weight distribution.

I claim:

1. A process comprising the step of contacting vinyl ether monomers with an initiator system consisting of an acidic zeolite selected from the group consisting of zeolite X, zeolite Y, and faujacite, and trimethylsilyliodide under conditions which result in polymerizing the vinyl ether.

2. The process of claim 1 wherein the vinyl ether, zeolite and trimethylsilyliodide are contacted in an inert solvent.

3. The process of claim 2 wherein the inert solvent is selected from the group consisting of hydrocarbons, halogenated hydrocarbons, ethers and mixtures thereof.

4. The process of claim 1 wherein the weight ratio of vinyl ether to zeolite is from about 2 to about 50.

5. The process of claim 1 wherein the molar ratio of vinyl ether monomer to trimethylsilyliodide is from about 10 to about 10,000 milliequivalents per gram of vinyl ether.

6. The process of claim 1 wherein the vinyl ether is of the formula $$H_2-C=CH-O-R$$

wherein R is an alkyl, cycloalkyl or alkyl substituted cycloalkyl, aromatic or alkyl substituted aromatic and R contains one to 20 carbon atoms.

7. The process of claim 6 wherein R is substituted with one or more halogens.

8. The process of claim 6 wherein R is substituted with a substituent selected from the group consisting of epoxy, tertiary amine, vinyl, siloxy and mixtures thereof.

9. The process of claim 6 wherein the vinyl ether is isobutylvinyl ether.

10. The process of claim 1 wherein the zeolite is molecular sieve 13X.

11. The process of claim 1 wherein the polymer produced has a number average molecular weight between about 1,000 and about 1,000,000.

12. The process of claim 11 wherein the polymer produced has a molecular weight distribution of less than about 2.5.

13. The process of claim 1 wherein the vinyl ether is isobutylvinyl ether.

14. The process of claim 13 wherein the polymer produced has a number average molecular weight of between about 1,000 and about 1,000,000.

15. The process of claim 14 wherein the polymer produced has a molecular weight distribution of less than about 2.5.

* * * * *